US010825468B2

(12) United States Patent
Henderson

(10) Patent No.: US 10,825,468 B2
(45) Date of Patent: Nov. 3, 2020

(54) NATURAL TRAVEL MODE DESCRIPTION SYSTEM

(71) Applicant: GE Aviation Systems Limited, Cheltenham (GB)

(72) Inventor: George R. Henderson, Cheltenham (GB)

(73) Assignee: GE AVIATION SYSTEMS LIMITED, Cheltenham (GB)

( * ) Notice: Subject to any disclaimer, the term of this patent is extended or adjusted under 35 U.S.C. 154(b) by 151 days.

(21) Appl. No.: 15/616,965

(22) Filed: Jun. 8, 2017

(65) Prior Publication Data
US 2017/0372723 A1    Dec. 28, 2017

(30) Foreign Application Priority Data

Jun. 22, 2016  (EP) .................................... 16175737

(51) Int. Cl.
*G06F 17/28* (2006.01)
*G10L 21/10* (2013.01)
(Continued)

(52) U.S. Cl.
CPC .............. *G10L 21/10* (2013.01); *B64D 43/00* (2013.01); *G06F 3/147* (2013.01); *G06F 3/167* (2013.01);
(Continued)

(58) Field of Classification Search
CPC .. G06F 3/167; G06F 2203/0381; G06F 17/27; G06F 3/0482; G06F 3/04847;
(Continued)

(56) References Cited

U.S. PATENT DOCUMENTS 6,745,113 B2    6/2004  Griffin, III et al.
6,904,340 B2    6/2005  Andre et al.
(Continued)

FOREIGN PATENT DOCUMENTS

CN          204360618 U    5/2015
DE   10 2005 063 077 A1    7/2007
(Continued)

OTHER PUBLICATIONS

Extended European Search Report and Opinion issued in connection with corresponding EP Application No. 16175737.2 dated Oct. 28, 2016.

*Primary Examiner* — Wilson W Tsui
(74) *Attorney, Agent, or Firm* — Dority & Manning, P.A.

(57) ABSTRACT

Systems and methods for providing natural language annunciations are provided. In one embodiment, a method can include receiving a set of data indicative of a user input associated with one or more travel modes. Information indicative of the one or more travel modes can be provided for display on a first display device. The method can further include generating an output indicative of a natural language annunciation based at least in part on the first set of data. The natural language annunciation can be indicative of the one or more travel modes using natural language syntax. The method can include sending the output indicative of the natural language annunciation to one or more other computing devices associated with a second display device.

18 Claims, 7 Drawing Sheets

(51) Int. Cl.
  *G06Q 10/00* (2012.01)
  *G06Q 50/30* (2012.01)
  *G09B 29/00* (2006.01)
  *B64D 43/00* (2006.01)
  *G06F 3/147* (2006.01)
  *G06F 3/16* (2006.01)
  *G10L 13/00* (2006.01)

(52) U.S. Cl.
  CPC .......... *G06Q 10/20* (2013.01); *G06Q 50/30* (2013.01); *G09B 29/007* (2013.01); *G10L 13/00* (2013.01)

(58) Field of Classification Search
  CPC ......... G06F 17/28; G06F 3/147; G10L 15/26; G10L 2015/223; G10L 21/10; G06Q 10/20; G06Q 50/30; B64D 43/00
  See application file for complete search history.

(56) References Cited

U.S. PATENT DOCUMENTS

| | | | |
|---|---|---|---|
| 7,236,858 B2 | 6/2007 | Carpenter et al. | |
| 7,584,091 B2 | 9/2009 | Gavieiro-Villatte et al. | |
| 7,606,715 B1* | 10/2009 | Krenz | 704/275 |
| 8,116,807 B2 | 2/2012 | Matas | |
| 8,504,947 B2 | 8/2013 | Forstall et al. | |
| 8,732,586 B2 | 5/2014 | Herzberg et al. | |
| 8,903,655 B2 | 12/2014 | Feyereisen et al. | |
| 8,930,180 B1 | 1/2015 | Murray et al. | |
| 9,132,913 B1 | 9/2015 | Shapiro et al. | |
| 9,925,874 B2* | 3/2018 | Oku | B60R 11/02 |
| 2003/0208356 A1* | 11/2003 | King | G10L 13/00 704/270 |
| 2004/0176906 A1* | 9/2004 | Matsubara | G01C 21/3608 701/432 |
| 2005/0091036 A1 | 4/2005 | Shackleton et al. | |
| 2007/0288129 A1* | 12/2007 | Komer | G10L 15/26 701/3 |
| 2010/0289963 A1* | 11/2010 | LeFort | G06F 3/1423 348/659 |
| 2012/0223959 A1 | 9/2012 | Lengeling | |
| 2013/0013133 A1 | 1/2013 | Walter | |
| 2013/0013314 A1* | 1/2013 | Boschker | G10L 13/00 704/260 |
| 2013/0245860 A1 | 9/2013 | Cooper | |
| 2014/0100722 A1 | 4/2014 | Louise et al. | |
| 2014/0136187 A1 | 5/2014 | Wolverton et al. | |
| 2014/0210729 A1* | 7/2014 | Chattopadhyay | G06F 3/0416 345/173 |
| 2014/0267035 A1* | 9/2014 | Schalk | G06F 3/017 345/158 |
| 2015/0293686 A1* | 10/2015 | Lee | G06F 3/0488 715/778 |
| 2016/0139876 A1* | 5/2016 | Alves | G06F 3/167 715/728 |

FOREIGN PATENT DOCUMENTS

| | | |
|---|---|---|
| EP | 1 503 301 A2 | 2/2005 |
| EP | 2 674 926 A1 | 12/2013 |
| JP | 2014-197289 A | 10/2014 |
| KR | 101483104 B1 | 1/2015 |
| WO | 2009/004479 A2 | 1/2009 |

* cited by examiner

NATURAL TRAVEL MODE DESCRIPTION SYSTEM

FIELD OF THE INVENTION

The present subject matter relates generally to providing annunciations for a vehicle, and more particularly to providing natural language annunciations for a vehicle.

BACKGROUND OF THE INVENTION

Vehicle display systems can display various settings and travel conditions associated with a vehicle. For instance, a flight deck of an aircraft can display various settings and flight conditions of the aircraft. Often these display systems include several display screens in order to communicate a variety of information to the operator. Some of the display screens can display similar, overlapping information that relies heavily on abbreviations to conserve space. However, different display screens can be associated with different vehicle systems, leading to the display of conflicting information about the operations of the vehicle. The heavy use of abbreviations, as well as conflicting information, can hinder the operators' understanding of the vehicle operations, cause confusion associated with the vehicle, and lower trust in the vehicle systems.

BRIEF DESCRIPTION OF THE INVENTION

Aspects and advantages of embodiments of the present disclosure will be set forth in part in the following description, or may be learned from the description, or may be learned through practice of the embodiments.

One example aspect of the present disclosure is directed to a computer-implemented method for providing natural language annunciations. The method can include receiving, by one or more computing devices, a set of data indicative of a user input associated with one or more travel modes. Information indicative of the one or more travel modes can be provided for display on a first display device. The method can further include generating, by the one or more computing devices, an output indicative of a natural language annunciation based at least in part on the set of data. The natural language annunciation can be indicative of the one or more travel modes using natural language syntax. The method can include sending, by the one or more computing devices, the output indicative of the natural language annunciation to one or more other computing devices associated with a second display device.

Another example aspect of the present disclosure is directed to a computing system for providing natural language annunciations. The system can include one or more processors and one or more memory devices included in a vehicle. The one or more memory devices can store instructions that when executed by the one or more processors cause the one or more processors to perform operations. The operations can include receiving a set of data indicative of a user input associated with one or more travel modes of a vehicle. The information indicative of the one or more travel modes of the vehicle can be provided for display on a first display device. The operations can further include generating an output indicative of a natural language annunciation based at least in part on the first set of data. The natural language annunciation can be indicative of the one or more travel modes of the vehicle using natural language syntax. The operations can include sending the output indicative of the natural language annunciation to one or more other computing devices associated with a second display device. The output indicative of the natural language annunciation can be provided for display on the second display device such that the output indicative of the natural language annunciation is consistent with the information indicative of the one or more travel modes of the vehicle displayed on the first display device.

Yet another example aspect of the present disclosure is directed to an aircraft. The aircraft can include a first computing system including a first display device. The first computing system can be configured to receive a user input associated with one or more flight modes of an aircraft and display, on the first display device, information indicative of the one or more flight modes of the aircraft. The first computing system can be configured to send a set of data indicative of the user input associated with the one or more flight modes of the aircraft. The aircraft can further include a second computing system configured to receive the set of data indicative of the user input associated with the one or more flight modes of the aircraft. The second system can be configured to generate an output indicative of a natural language annunciation based at least in part on the set of data. The natural language annunciation can be indicative of the one or more flight modes of the aircraft and can be consistent with the information indicative of the one or more flight modes displayed on the first display device. The second system can be configured to send the output indicative of the natural language annunciation. The aircraft can include a third computing system including a second display device. The third computing system can be configured to receive the output indicative of the natural language annunciation, and display, on the second display device, the output indicative of the natural language annunciation.

Other example aspects of the present disclosure are directed to systems, methods, aircrafts, avionics systems, devices, user interfaces, and/or non-transitory computer-readable media for providing natural language annunciations for an aircraft.

Variations and modifications can be made to these example aspects of the present disclosure.

These and other features, aspects and advantages of various embodiments will become better understood with reference to the following description and appended claims. The accompanying drawings, which are incorporated in and constitute a part of this specification, illustrate embodiments of the present disclosure and, together with the description, serve to explain the related principles.

BRIEF DESCRIPTION OF THE DRAWINGS

Detailed discussion of embodiments directed to one of ordinary skill in the art are set forth in the specification, which makes reference to the appended figures, in which.

DETAILED DESCRIPTION OF THE INVENTION

Figure 1:
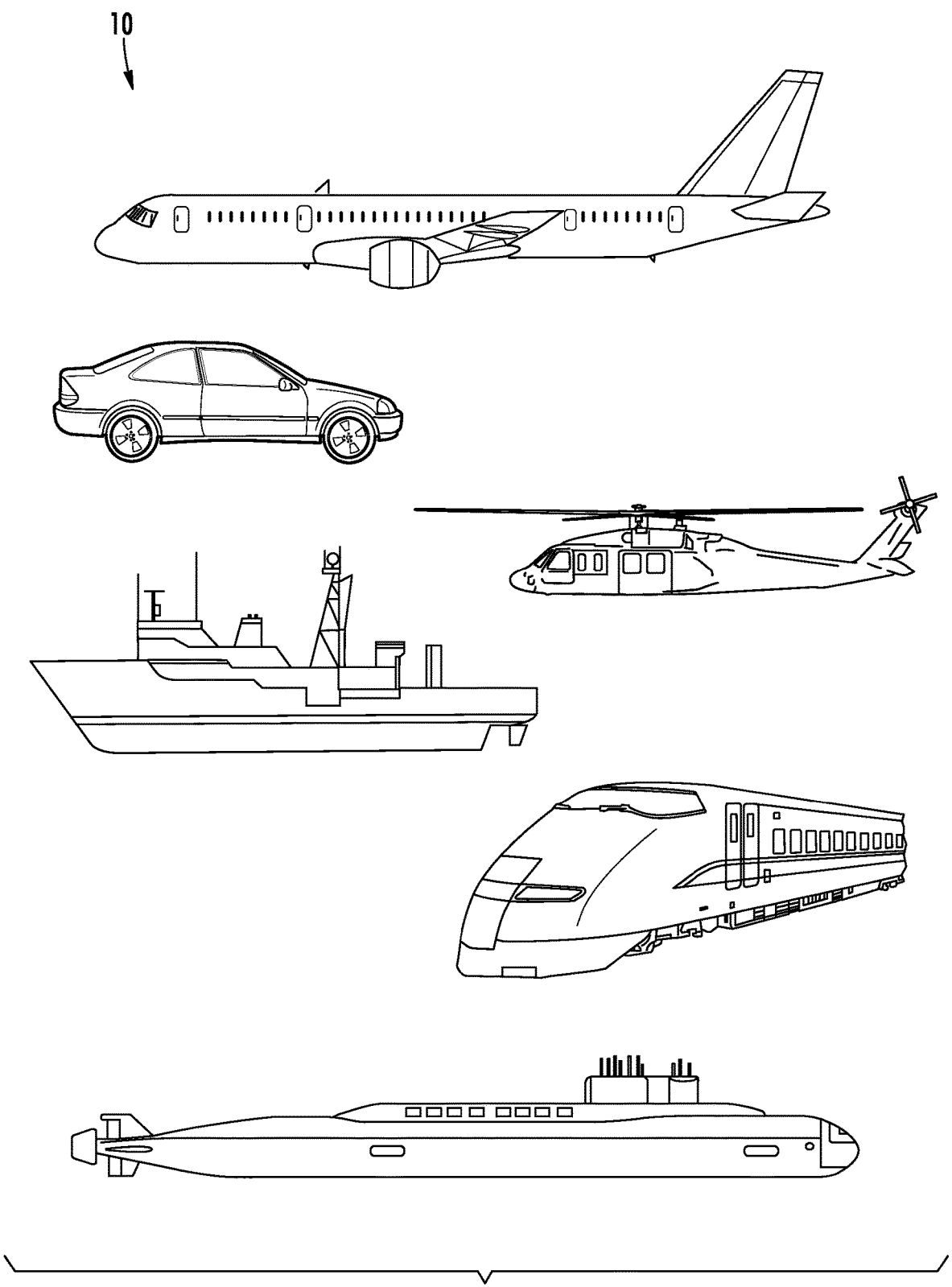
FIG. 1 depicts example vehicles according to example embodiments of the present disclosure.

Reference now will be made in detail to embodiments of the present disclosure, one or more example(s) of which are illustrated in the drawings. Each example is provided by way of explanation of the present disclosure, not limitation of the present disclosure. In fact, it will be apparent to those skilled in the art that various modifications and variations can be made in the present disclosure without departing from the scope or spirit of the present disclosure. For instance, features illustrated or described as part of one embodiment can be used with another embodiment to yield a still further embodiment. Thus, it is intended that the present disclosure covers such modifications and variations as come within the scope of the appended claims and their equivalents.

Example aspects of the present disclosure are directed to systems and methods for providing natural language annunciations indicating vehicle travel modes. The systems and methods of the present disclosure can be implemented in a variety of vehicles. By way of example, an aircraft can include a computing system that can provide consistency between flight mode displays within a cockpit. For example, an aircraft computing system can receive a set of data indicative of a user input selecting one or more travel mode(s) (e.g., flight mode(s)) of the aircraft. The user input can be that of a pilot selecting and/or adjusting the aircraft's travel modes via a flight management system and/or an autopilot system. The flight management system (and/or the autopilot system) can display information indicative of the aircraft's travel mode(s). The computing system can generate an output indicative of a natural language annunciation indicating the aircraft's travel mode(s) using natural language syntax based, at least in part, on the set of data received from the flight management system and/or the autopilot system. Natural language syntax can include a readable, natural, conversational style description. Thus, the natural language annunciation can include an indication of the travel mode(s) (e.g., travel mode(s)) in a readable, natural, conversational manner.

The computing system can send the output to the flight mode annunciator, which can display the natural language annunciation for a pilot. The natural language annunciation can be consistent with (e.g., the same as, substantially similar to, convey substantially similar information as, etc.) the information indicative of the aircraft's travel mode(s) displayed on by the flight management system (and/or the autopilot system). In this way, the display devices of the cockpit flight deck can consistently indicate the aircraft's travel mode, reducing potential operator confusion. Moreover, the highly readable, natural, conversational style of the natural language annunciation can allow for quicker recognition and understanding of what the vehicle (e.g., aircraft) is trying to do, what the vehicle is actually doing, and/or what the vehicle is going to do next.

More particularly, a vehicle can include a first computing system, a second computing system, and a third computing system. For example, with respect to an aircraft, the first computing system can be associated with a flight management system and/or an autopilot system. The first computing system can receive a user input associated with one or more travel mode(s) of the vehicle. The user input can be, for example, a voice input (e.g., provided via an input device with a microphone). The one or more travel mode(s) can include at least one of a current travel mode associated with the vehicle and/or a future travel mode associated with the vehicle. The first computing system can display the information indicative of the travel mode(s) of the vehicle on a first display device. By way of example, for an aircraft, an operator can provide an input to the flight management system indicating that the aircraft should implement an autonomous flight mode en route to an airport (e.g., JFK). This input can be displayed on a screen associated with the flight management system such that the flight crew member can visualize that she has indicated that the aircraft should implement an autonomous flight mode en route to JFK airport. In some implementations, the operator can confirm the accuracy of the displayed travel mode(s), as further described herein. The first computing system can send a set of data indicative of the user input associated with the travel mode(s) of the vehicle to the second computing system.

The second computing system can be configured to coordinate consistent travel mode indications within a cockpit. For instance, the second computing system can receive the set of data indicative of the user input associated with the travel mode(s) of the vehicle. The second computing system can generate an output indicative of a natural language annunciation based, at least in part, on the set of data, as further described herein. The natural language annunciation can be indicative of the vehicle's one or more travel mode(s), using natural language syntax. The second computing system can generate the output such that the natural language annunciation can be consistent with the information displayed on the first display device. For example, in the case of an aircraft, using the operator's input, the second computing system can generate an annunciation indicating, in natural language syntax, that the aircraft is to be in an autonomous travel mode while traveling to JFK airport. The second computing system can send an output (indicative of the natural language annunciation) to the third computing system. The third computing system can be associated with, for example, a flight mode annunciator of the aircraft.

The third computing system can receive the output indicative of the natural language annunciation and display it on a second display device. The output can be displayed such that the output indicative of the natural language annunciation is consistent with the information indicative of the vehicle's travel mode(s) displayed on the first display device (e.g., associated with the flight management system and/or the autopilot system). For example, the flight mode annunciator of the aircraft can display the annunciation indicating, in natural language syntax, that the aircraft is to be in an autonomous travel mode while traveling to JFK airport. In this way, the flight mode annunciator can use easily-readable, natural language to convey the same travel mode (e.g., autonomous flight mode to JFK) as shown by the flight management system and/or the auto-pilot system.

The systems and methods according to example aspects of the present disclosure provide highly readable, understandable natural language travel mode annunciations that are consistent with the travel modes displayed elsewhere on a vehicle display system. More particularly, the natural language annunciations can reduce overreliance on abbreviations and provide an output that is independent of the look-and-feel and/or placement of the annunciation. Furthermore, the systems and methods can enable multi-model interfaces (e.g., touch-voice combinations), as well as facilitate next generation operations through efficient interface usage. In this way, the systems and methods according to example aspects of the present disclosure have a technical effect of more easily communicating complex travel modes to an operator of a vehicle, reducing the need to revert to a manual control mode, and increasing safety through lower operator confusion/workload and higher situational awareness.

With reference now to the FIGS., example embodiments of the present disclosure will be discussed in further detail. FIG. 1 depicts example vehicles 10 according example embodiments of the present disclosure. The systems and methods of the present disclosure can be implemented on an aircraft, helicopter, automobile, boat, submarine, train, and/or any other suitable vehicles. While the present disclosure is described herein with reference to an aircraft implementation, this is intended only to serve as an example and not to be limiting. One of ordinary skill in the art would understand that the systems and methods of the present disclosure can be implemented on other vehicles without deviating from the scope of the present disclosure.

Figure 2:
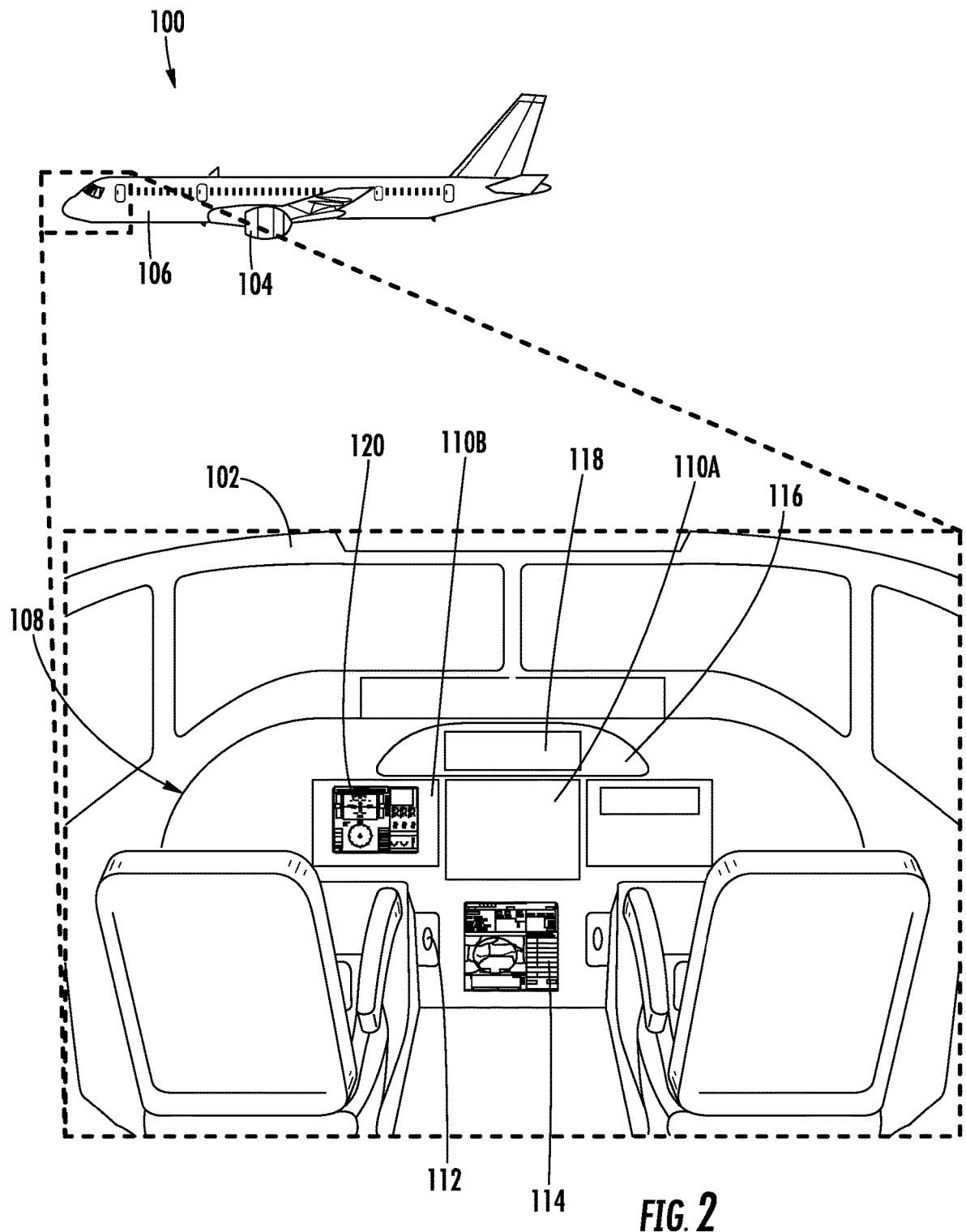
FIG. 2 depicts a perspective view of an example portion of an aircraft according to example embodiments of the present disclosure.

FIG. 2 depicts a perspective view of an example portion of an aircraft 100 according to example embodiments of the present disclosure. The aircraft 100 can include, for instance, a cockpit 102, one or more engine(s) 104, and a fuselage 106. The aircraft 100 can include a flight deck 108, which can include one or more display device(s) 110A-B (e.g., multifunctional flight display devices) including one or more display screens. For example, the aircraft 100 can a first display device 110A and a second display device 110B. A user (e.g., a flight crew member, a pilot) can be present in the cockpit (e.g., in a seat facing the display device(s) 110A-B).

The aircraft 100 can include one or more input device(s) 112 (e.g., in the cockpit 102) that can be configured to provide input to one or more system(s) of the aircraft 100. The input device(s) 112 can include any device suitable to accept input from a user for interaction with the systems of the aircraft 100. For example, the input device(s) 112 can include a keyboard, joystick, multi-way rocker switches, mouse, trackball, touch screen, touch pad, data entry keys, a microphone suitable for voice recognition, and/or any other suitable device. In some implementations, the input device(s) 112 can be configured to allow the user to interact with a graphic and/or textual data element provided for display on the display device(s) 110A-B.

The aircraft can include a flight management system 114. The flight management system 114 can be configured to manage the flight control of the aircraft 100. For instance, the flight management system 114 can be configured to implement, manage, and/or control a flight mode, flight path, flight plan, flight trajectory, etc. for the aircraft 100. The flight management system 114 can be configured to receive input from a user. In some implementations, the flight management system 114 can receive user input via the one or more input device(s) 112. Additionally, and/or alternatively, the flight management system 114 can be associated with a display device (e.g., the first display device 110A) that the user can interact with and/or that can be configured to display information associated to the flight management system 114. For example, the first display device 110A can include one or more user interfaces. The first display device 110A can be operably coupled with the input devices 112 such that a user can interact with the user interface (e.g., cursor interaction via trackball, mouse, etc.) and the textual and/or graphical elements included in the user interface. Additionally, and/or alternatively, the first display device 110A can include a touch display screen that can allow a user to visualize the user interface on the touch display screen and interact with the user interface (and the flight management system 114) through the touch display screen. The flight management system 114 can be configured to implement one or more travel mode(s), flight plans, etc. of the aircraft 100 selected by user input and display information associated with the one or more travel mode(s) (e.g., flight mode(s)) on a display device (e.g., first display device 110A).

The aircraft 100 can include an autopilot system 116. The autopilot system 116 can be configured to assist in the control of the trajectory of the aircraft 100 with and/or without user (e.g., pilot) interaction. For instance, the autopilot system 116 can be configured to assist the aircraft 100 to operate in various control modes. For example, the autopilot system 116 can be configured to assist the aircraft 100 to operate in an "autonomous" control mode (e.g., no user control) and/or a "shared" control mode (e.g., some user control, some autopilot system 116 automated control). In some implementations, the aircraft 100 can operate in a "manual" control mode by which, for example, there is limited-to-no autopilot system 116 automated control of the aircraft 100. The autopilot system 116 can include a guidance panel 118 with can be configured to, for example, receive user input to interact with the autopilot system 116 (e.g., to select travel modes, control modes). The guidance panel 118 can include one or more physical control interfaces, user interfaces, and/or be coupled to the input device(s) 112 to receive user input.

In some implementations, the autopilot system 116 can be associated with a display device (e.g., the first display device 110A), such that the autopilot system 116 can display information associated with the autopilot system 116 (e.g., travel modes, control modes). In some implementations, the associated display device (e.g., first display device 110A) can include one or more user interface(s). For example, the first display device 110A can be operably coupled with the input devices 112 such that a user can interact with the user interface (e.g., cursor interaction via trackball, mouse, etc.) and the textual and/or graphical elements included in the user interface. Additionally, and/or alternatively, the first display device 110A can include a touch display screen that can allow a user to visualize the user interface on the touch display screen and interact with the user interface (and the autopilot system 116) through the touch display screen. In some implementations, the guidance panel 118 can include the first display device 110A and/or a display device that can perform similar operations and/or functions, as described herein.

The aircraft 100 can include a flight mode annunciator 120 that can be configured to inform the flight crew of a past, current, and/or future status of the aircraft 100. For instance, the second display device 110B can be associated with the flight mode annunciator 120. The flight mode annunciator 120 can be configured to display (e.g., via the second display device 110B) one or more past, current, and/or future travel mode(s) associated with the aircraft 100, as well as other information associated with the status of the aircraft 100.

Figure 3:
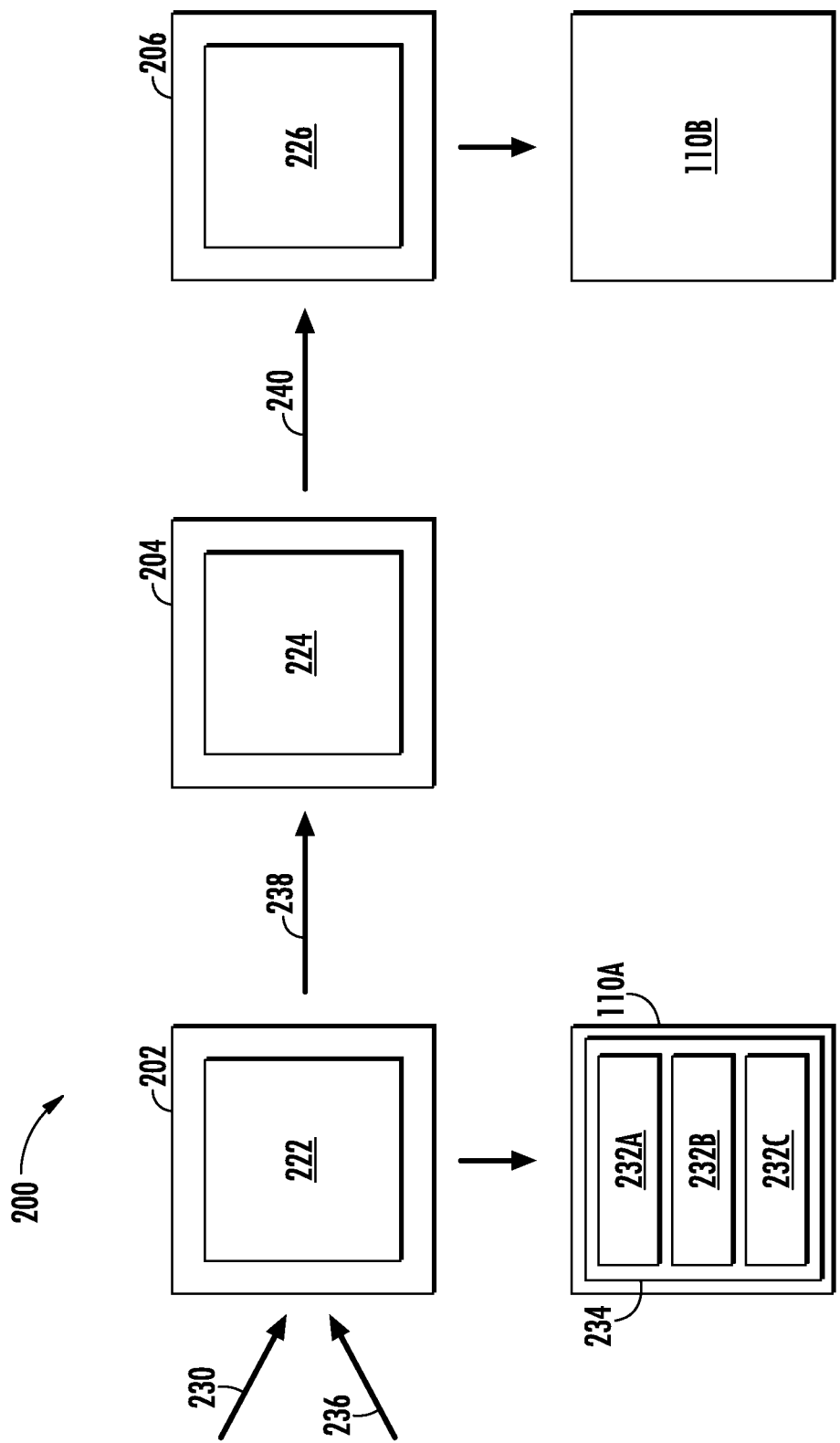
FIG. 3 depicts an example system according to example embodiments of the present disclosure.

FIG. 3 depicts an example system 200 according to example embodiments of the present disclosure. The system 200 can be included on a vehicle 10 such as, for example, the aircraft 100. As shown in FIG. 2, the system 200 can include a first computing system 202, a second computing system 204, and a third computing system 206. Additionally, and/or alternatively, the system 200 can include the first display device 110A and the second display device 110B. The first computing system 202, the second computing system 204, the third computing system 206, the first display device 110A, and/or the second display device 110B can be configured to be in wired and/or wireless communication with one or more of each other.

In some implementations, the first computing system 202 can be associated with at least one of the flight management system 114 of the aircraft 100 and/or the autopilot system 116 of the aircraft 100. The first computing system 202 can include the first display device 110A. Additionally, and/or alternatively, the first computing system 202 can include one or more computing device(s) 222. The computing device(s) 222 can include various components for performing various operations and functions. For example, and as further described herein, the computing device(s) 222 can include one or more processor(s) and one or more memory device(s). The one or more memory device(s) can store instructions that when executed by the one or more processor(s) cause the one or more processor(s) to perform the operations and functions, as described herein.

For example, the computing device(s) 222 of the first computing system 202 can be configured to receive a user input 230 associated with one or more travel mode(s) 232A-C of a vehicle 10. The user input 230 (e.g., a voice input) can be received, for example, from the input device(s) 112. For example, the user input 230 can indicate one or more travel mode(s) 232A-C (e.g., flight mode(s)) selected by a user. The travel mode(s) 232A-C of the vehicle can be indicative of one or more control mode(s), objective(s), procedure(s), instruction(s), directive(s), condition(s), distance(s), altitude(s), location(s), destination(s), movement(s), orientation(s), travel path(s), travel plan(s), trajectory(ies), etc. associated with the travel of the vehicle 10. The one or more travel mode(s) 232A-C can include at least one of a past travel mode 232A associated with the vehicle 10, a current travel mode 232B associated with the vehicle 10, and/or a future travel mode 232C associated with the vehicle 10. By way of example, a user can use the input device(s) 112 (e.g., a mouse) to select one or more travel mode(s) 232A-C and/or conditions associated therewith (e.g., control mode, destination, approach to runway, wind, temperature).

The computing device(s) 222 of the first computing system 202 can be configured to display information 234 indicative of the one or more travel mode(s) 232A-C of the vehicle 10. For example, the computing device(s) 222 can be configured to display the information 234 indicative of the one or more travel mode(s) 232A-C of the aircraft 100 on the first display device 110A. The information 234 can be indicative of the conditions and/or parameters associated with the one or more travel mode(s) 232A-C (e.g., flight mode(s)) of the aircraft 100.

In some implementations, the first computing system 202 can be configured to confirm that the information 234 indicative of the one or more travel mode(s) 232A-C of the aircraft 100 (e.g., on the first display device 110A) is accurate. For example, after display of the information 234 on the first display device 110A, a user can provide a second user input 236 confirming that the information 234 displayed on the first display device 110A is accurate and/or desirable. The computing device(s) 222 of the first computing system 202 can be configured to receive a second user input 236 confirming the information 234 displayed on the first display device 110A. By way of example, at least a portion of the first display device 110A can display information 234 indicative of a current travel mode 232B (e.g., "autonomous", "direct to JFK", "Arrive JFK at 2010z", "−3.0° to 2000 ft"). The user can use the input device(s) 112 to confirm the information 234 (e.g., via an interaction button). In some implementations, the user can reject the information 234 (e.g., via an interactive button).

Additionally, and/or alternatively, the computing device(s) 222 of the first computing system 202 can be configured to send a set of data 238 indicative of the user input 230 associated with one or more travel mode(s) 232A-C of the vehicle 10 (e.g., flight modes of the aircraft 100). For instance, the computing device(s) 222 can be configured to send the set of data 238 to the second computing system 204.

The second computing system 204 can be configured to coordinate consistent travel mode indications between the first and second display device(s) 110A-B. The second computing system 204 can include one or more computing device(s) 224. The computing device(s) 224 can include various components for performing various operations and functions. For example, and as further described herein, the computing device(s) 224 can include one or more processor(s) and one or more memory device(s). The one or more memory device(s) can store instructions that when executed by the one or more processor(s) cause the one or more processor(s) to perform the operations and functions for providing natural language annunciations, as described herein.

For instance, the computing device(s) 224 of the second computing system 204 can be configured to receive the set of data 238 indicative of the user input 230 associated with one or more travel mode(s) 232A-C of the vehicle 10. The computing device(s) 224 can receive the set of data 238 from the first computing system 202 (e.g., associated with the flight management system 114, the autopilot system 116). As described above, information 234 indicative of the one or more travel mode(s) 232A-C can be provided for display on the first display device 110A.

The computing device(s) 224 of the second computing system 204 can be configured to generate an output 240 indicative of a natural language annunciation based, at least in part, on the first set of data 238. The natural language annunciation can be indicative of the one or more travel mode(s) 232A-C (e.g., flight mode(s)) of a vehicle (e.g., the aircraft 100) using natural language syntax, as described above. Moreover, the natural language annunciation can be consistent with the information 234 indicative of the one or more travel mode(s) 232A-C displayed on the first display device 110A.

For instance, computing device(s) 224 of the second computing system 204 can be configured to generate the output 240 indicative of the natural language annunciation based, at least in part, on one or more parameter(s) associated with the one or more travel mode(s) 232A-C of the of the vehicle 10. FIG. 3 depicts example parameters 300 and example natural language annunciations 306 (e.g., related to the aircraft 100) according to example embodiments of the present disclosure. The parameters 300 can be stored in the one or more memory device(s) of the computing device(s) 224.

The parameters 300 can include one or more control mode(s) 302. For instance, the control mode(s) 302 can include the "autonomous" control mode, the "shared" control mode, and/or the "manual" control mode, as described above. In some implementations, the first set of data 238 can indicate a control mode that the user desires to select for operation of the vehicle 10 (e.g., aircraft 100). For example, if the first set of data 238 indicates that the user input 230 has selected the "autonomous" control mode, the computing device(s) 224 can generate the output 240 based, at least in part, on the "autonomous" control mode.

Additionally, and/or alternatively, the parameters 300 can include one or more keyword(s) 304. For instance, the keywords(s) 304 can include goals (e.g., fly to), plans (e.g., follow, intercept, take-off, land), constraints (e.g., at, before, after, at least), stipulations (e.g., 3.0°, 2000 ft., 160 kts, 2010z), value statements (e.g., ASAP, economy, smooth), etc. The first set of data 238 can include data that is similar to and/or matches one or more of the keyword(s) 304. For example, in the event that the user input 230 includes time related terms, such as "2010z", when describing the desired travel mode(s) 232A-C, the first set of data 238 can include data indicative of the time related terms. The computing device(s) 224 of the second computing system 204 can be configured to analyze the first set of data 238 to identify any terms and/or phrases that may be similar to and/or match one or more of the keyword(s) 304. The computing device(s) 224 can be configured to generate the output 240 indicative of the natural language annunciation based, at least in part, on the one or more keyword(s) 304 associated with the one or more travel mode(s) 232A-C of the vehicle 10 (e.g., the aircraft 100).

The computing device(s) 224 can be configured to generate a natural language annunciation. For instance, the computing device(s) 224 can process the first set of data 238 to determine any parameters 300 associated with the user input 230 associated with the travel mode(s) 232A-C. Using the determined parameters 300, the computing device(s) 224 can be configured to generate one or more natural language annunciation(s) 306 based, at least in part, on the first set of data 236 and/or the parameter(s) 300. For example, the natural language annunciation(s) 306 can include a control mode (e.g., "autonomous"), a constraint (e.g., "arrive at JFK"), a two dimensional lateral mode (e.g., "direct to JFK"), a stipulation (e.g., −3.0° to 2000 ft), etc. In this way, the computing device(s) 224 can be configured to generate the output 240 indicative of the natural language annunciation 306, such that it is consistent with the information 234 indicative of the travel mode(s) 232A-C displayed on the first display device 110A.

Returning, to FIG. 2, the computing device(s) 224 can be configured to send the output 240 indicative of the natural language annunciation 306 to one or more other computing devices associated with the second display device 110B. The output 240 indicative of the natural language annunciation 306 can be provided for display on the second display device 110B such that the output 240 indicative of the natural language annunciation 306 can be consistent with the information 234 indicative of the one or more travel mode(s) 232A-C of the vehicle 10 (e.g., the aircraft 100) displayed on the first display device 100A, as described herein. For instance, the computing device(s) 224 can be configured to send the output 240 to the computing device(s) 226 of the third computing system 206. The third computing system 206 can be associated with, for example, the flight mode annunciator 120.

The third computing system 206 can include the second display device 110B. Additionally, and/or alternatively, the third computing system 206 can include one or more computing device(s) 226. The computing device(s) 226 can include various components for performing various operations and functions. For example, and as further described herein, the computing device(s) 226 can include one or more processor(s) and one or more memory device(s). The one or more memory device(s) can store instructions that when executed by the one or more processor(s) cause the one or more processor(s) to perform the operations and functions, as described herein.

The computing device(s) 226 of the third computing system 206 can be configured to receive the output 240 and display it. For instance, the computing device(s) 226 of the third computing system 206 can be configured to receive the output 240 indicative of the natural language annunciation 306 from the computing device(s) 224 of the second computing system 204. The computing device(s) 226 of the third computing system 206 can be configured to display (e.g., on the second display device 110B) the output 240 indicative of the natural language annunciation 306.

Figure 4:
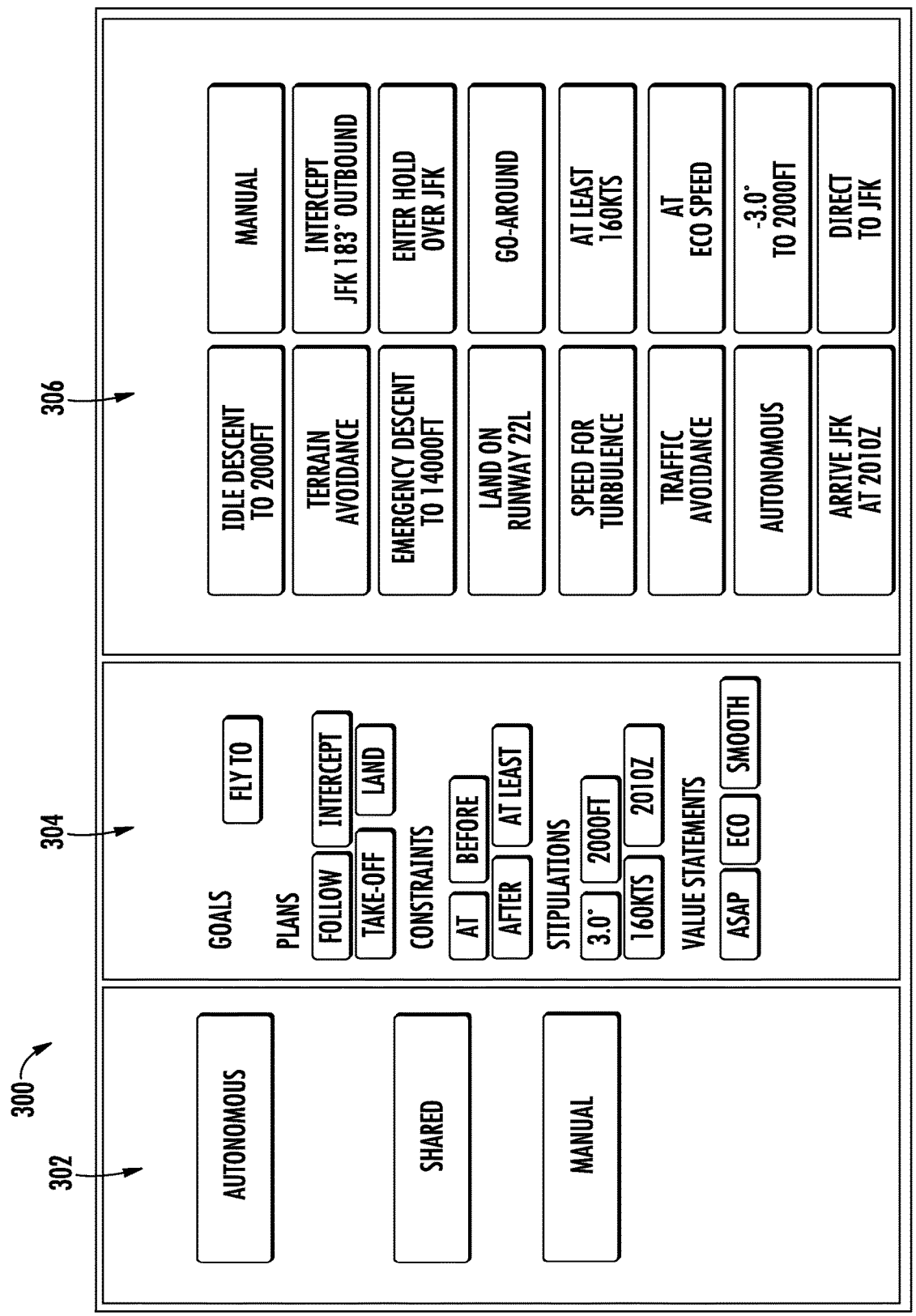
FIG. 4 depicts example parameters and natural language annunciations according to example embodiments of the present disclosure.
Figure 5:
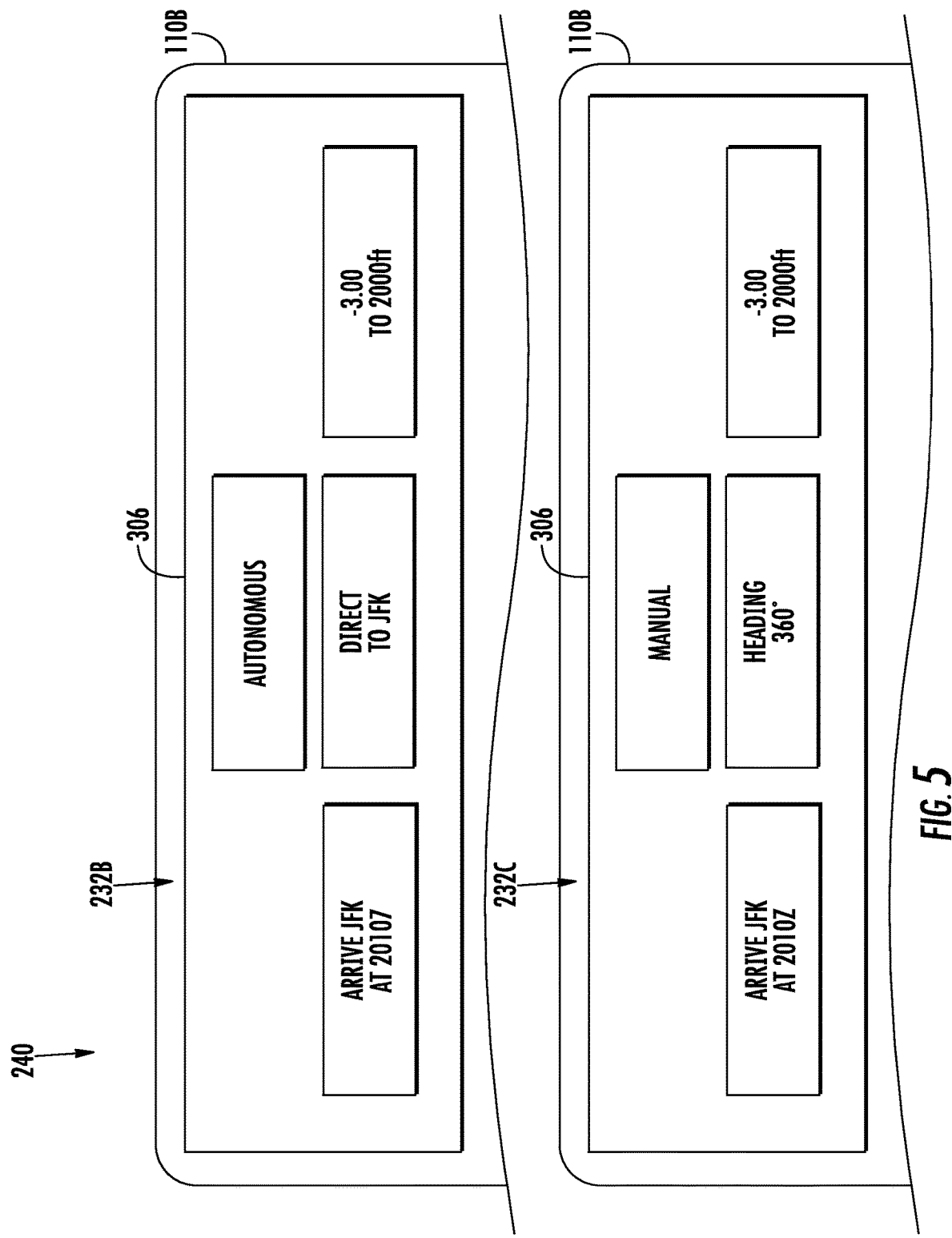
FIG. 5 depicts an example output according to example embodiments of the present disclosure.

FIG. 4 depicts an example output 240 according to example embodiments of the present disclosure. For example, with respect to aircraft 100, the output 240 can be displayed as a flight mode annunciation on the flight mode annunciator 120 (e.g., associated with the second display device 110B). The output 240 can be indicative of a natural language annunciation 306 that is indicative of a current travel mode (e.g., 232B) associated with the vehicle 10 (e.g., the aircraft 100) using natural language syntax. For example, the natural language annunciation 306 can indicate that under the current travel mode (e.g., current flight mode), the aircraft 100 is in the "autonomous" control mode (e.g., autopilot mode). The natural language annunciation 306 can indicate a time/speed constraint under the current travel mode such that the aircraft is to "Arrive JFK at 2010z". Additionally, and/or alternatively, the natural language annunciation 306 can indicate a two-dimensional lateral mode (e.g., "Direct to JFK") and/or a stipulation as to the vertical mode ("−3.0° to 2000 ft").

Additionally, and/or alternatively, the output 240 can be indicative of a natural language annunciation 306 that is indicative of a future travel mode (e.g., 232C) associated with the vehicle 10 (e.g., the aircraft 100) using natural language syntax. For example, the natural language annunciation 306 can indicate that under the future travel mode, the vehicle 10 (e.g., the aircraft 100) is to enter the "manual" control mode (e.g., autopilot mode). Additionally, and/or alternatively, the natural language annunciation 306 can indicate a two-dimensional lateral mode (e.g., "Heading 360°") that is different than under the current travel mode.

The computing device(s) 226 of the third computing system 206 can be configured to display (e.g., on the second display device 110B) the output 240 indicative of the natural language annunciations 306. For instance, the output 240 indicative of the natural language annunciation 306 can be displayed on the second display device 110B such that the output 240 indicative of the natural language annunciation 306 is consistent with the information 234 indicative of the one or more travel mode(s) (e.g., 232B-C) of the vehicle 10 (e.g., the aircraft 100) displayed on the first display device 110A. This can allow the operator (e.g., pilot) to view a travel mode annunciation that conveys travel mode(s) that are consistent with those shown on a display device associated with other computing systems of the vehicle (e.g., the flight management system, the autopilot system).

Figure 6:
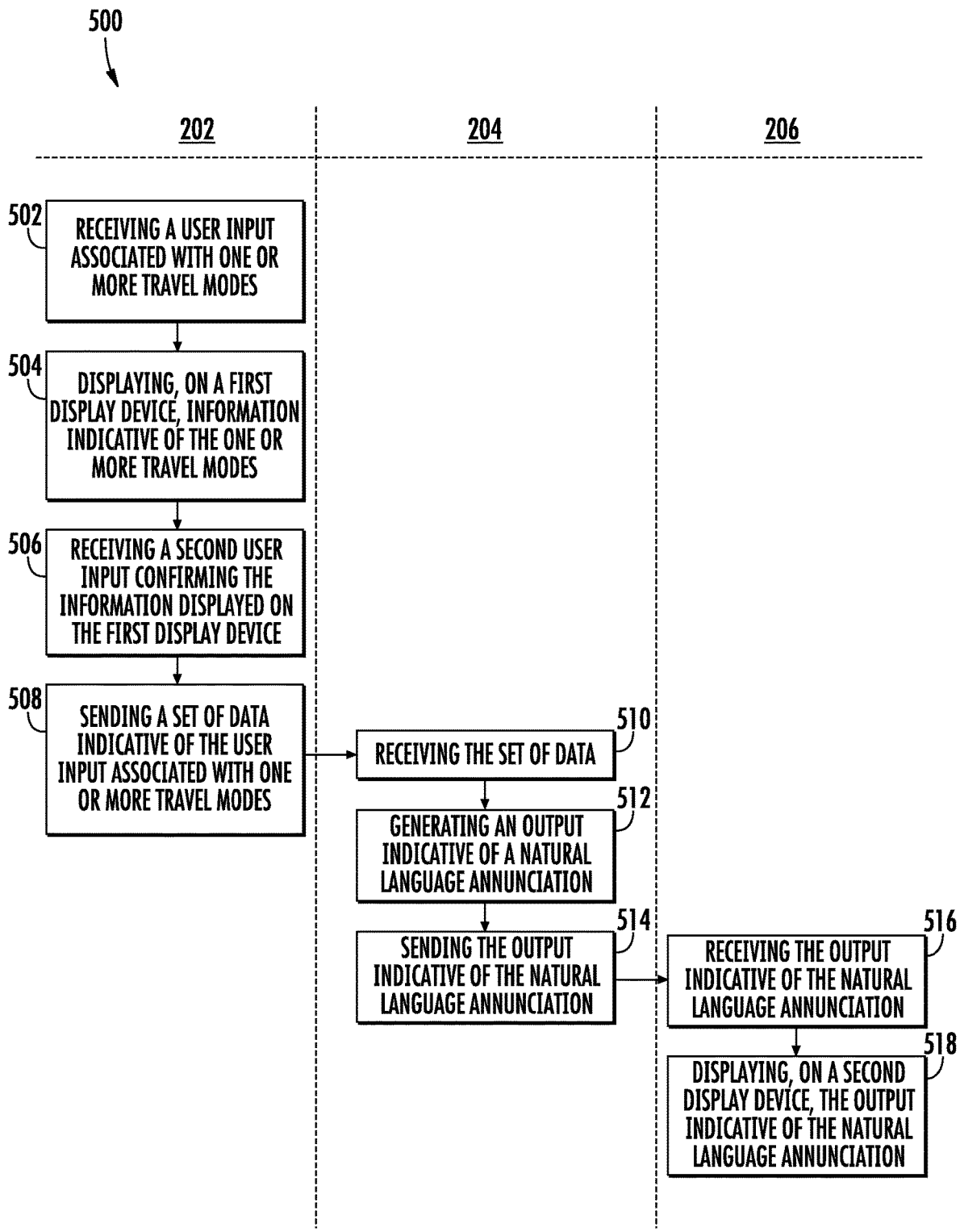
FIG. 6 depicts a flow diagram of an example method according to example embodiments of the present disclosure.

FIG. 6 depicts a flow diagram of an example method 500 according to example embodiments of the present disclosure. FIG. 6 can be implemented by one or more computing device(s), such as the computing device(s) 222, 224, and 226 depicted in FIGS. 2 and 6. One or more step(s) of the method 500 can be performed while the vehicle 10 is in operation (e.g., the aircraft 100 is in-flight). In addition, FIG. 6 depicts steps performed in a particular order for purposes of illustration and discussion. Those of ordinary skill in the art, using the disclosures provided herein, will understand that the various steps of any of the methods disclosed herein can be modified, adapted, expanded, rearranged, and/or omitted in various ways without deviating from the scope of the present disclosure.

At (502), the method 500 can include receiving a user input associated with one or more travel modes. For instance, the computing device(s) 222 of the first computing system 202 (e.g., associated with the flight management system 114 and/or the autopilot system 116) can receive a user input 230 associated with one or more travel mode(s) 232A-C. The user input 230 can be, for example, a voice input (e.g., provided via an input device 112 with a microphone). In some implementations, the user input 230 can be provided via the input device(s) 112. In some implementations associated with the aircraft 100, the user input 230 can be provided via the guidance panel 118 of the autopilot system 116. The one or more travel mode(s) 232A-C can include at least one of the current travel mode 232B associated with the vehicle 10 and/or the future travel mode 232C associated with the vehicle 10.

At (504), the method 500 can include displaying, on a first display device, information indicative of the one or more travel modes. For instance, the computing device(s) 222 of the first computing system 202 can display information 234 indicative of the one or more travel mode(s) 232A-C. For example, the computing device(s) 222 can display the information 234 indicative of the one or more travel mode(s) 232A-C (e.g., flight modes of the aircraft 100) on the first display device 110A. The information 234 can be indicative of the current travel mode 232B (e.g., current flight mode) associated with the vehicle 10 (e.g., the aircraft 100) and/or the future travel mode 232C (e.g., future flight mode) associated with the vehicle 10 (e.g., the aircraft 100).

In some implementations, at (506), the method 500 can include receiving a second user input confirming the information displayed on the first display device. For instance, a user can provide a second user input 236 confirming that the information 234 displayed on the first display device 110A is accurate. The computing device(s) 222 of the first computing system 204 can receive the second user input 236 confirming the information 234 displayed on the first display device 110A. By way of example, the user (e.g., operator) of the aircraft 100 can confirm that the flight mode(s) indicated in the user input 230 are indeed the one or more fight mode(s) indicated in the information 234 displayed on the first display device 110A.

At (508), the method 500 can include sending a set of data indicative of the user input associated with one or more travel mode(s). For instance, the computing device(s) 222 of the first computing system 202 can send a first set of data 238 indicative of the user input 230 associated with one or more travel mode(s) 232A-C (e.g., flight modes of the aircraft 100). The computing device(s) 222 can send the set of data 238 to the second computing system 204.

At (510), the method 500 can include receiving the set of data. For instance, the computing device(s) 224 of the second computing system 204 can receive the set of data 238 indicative of a user input 230 associated with one or more travel mode(s) 232A-C. By way of example, the set of data 238 can be received from at least one of the flight management system 114 of the aircraft 100 and/or the autopilot system 116 of the aircraft 100, associated with the first computing system 202. As described above, the information 234 indicative of one or more travel mode(s) 232A-C can be provided for display on the first display device 110A. In some implementations, the first display device 110A can be associated with a flight management system 114 of the aircraft 100. In some implementations, the first display device 110A can be associated with the autopilot system 116 of the aircraft 100.

At (512), the method 500 can include generating an output indicative of a natural language annunciation. For instance, the computing device(s) 224 of the second computing system 204 can generate an output 240 indicative of a natural language annunciation 306 based, at least in part, on the set of data 238. In some implementations, the computing device(s) 224 can generate the output 240 indicative of the natural language annunciation 306 based, at least in part, on one or more parameter(s) 300 associated with the one or more travel mode(s) 232A-C of the vehicle 10. The natural language annunciation 306 can be indicative of the one or more travel mode(s) 232A-C, using natural language syntax. Additionally, and/or alternatively, the natural language annunciation 306 can be consistent with the information 234 indicative of the one or more travel mode(s) 232A-C displayed on the first display device 110A.

At (514), the method 500 can include sending the output indicative of the natural language annunciation. The computing device(s) 224 of the second computing system 204 can send the output 240 indicative of the natural language annunciation 306 to one or more other computing device(s) associated with the second display device 110B. For instance, the computing device(s) 224 can send the set of data 238 to the computing device(s) 226 of the third computing system 206. In some implementations, the third computing system 206 and/or the second display device 110B can be associated with the flight mode annunciator 120 of the aircraft 100.

At (516), the method 500 can include receiving the output indicative of the natural language annunciation. For instance, the computing device(s) 226 of the third computing system 206 can receive the output 240 indicative of the natural language annunciation 306. At (518), the method 500 can include displaying, on a second display device, the output indicative of the natural language annunciation. For instance, the computing device(s) 226 of the third computing system 206 can display the output 240 indicative of the natural language annunciation 306 on the second display device 110B. The output 240 indicative of the natural language annunciation 306 can be displayed on the second display device 110B such that the output 240 indicative of the natural language annunciation 306 is consistent with the information 238 indicative of the one or more travel mode(s) 232A-C of the vehicle 10 displayed on the first display device 110A.

Figure 7:
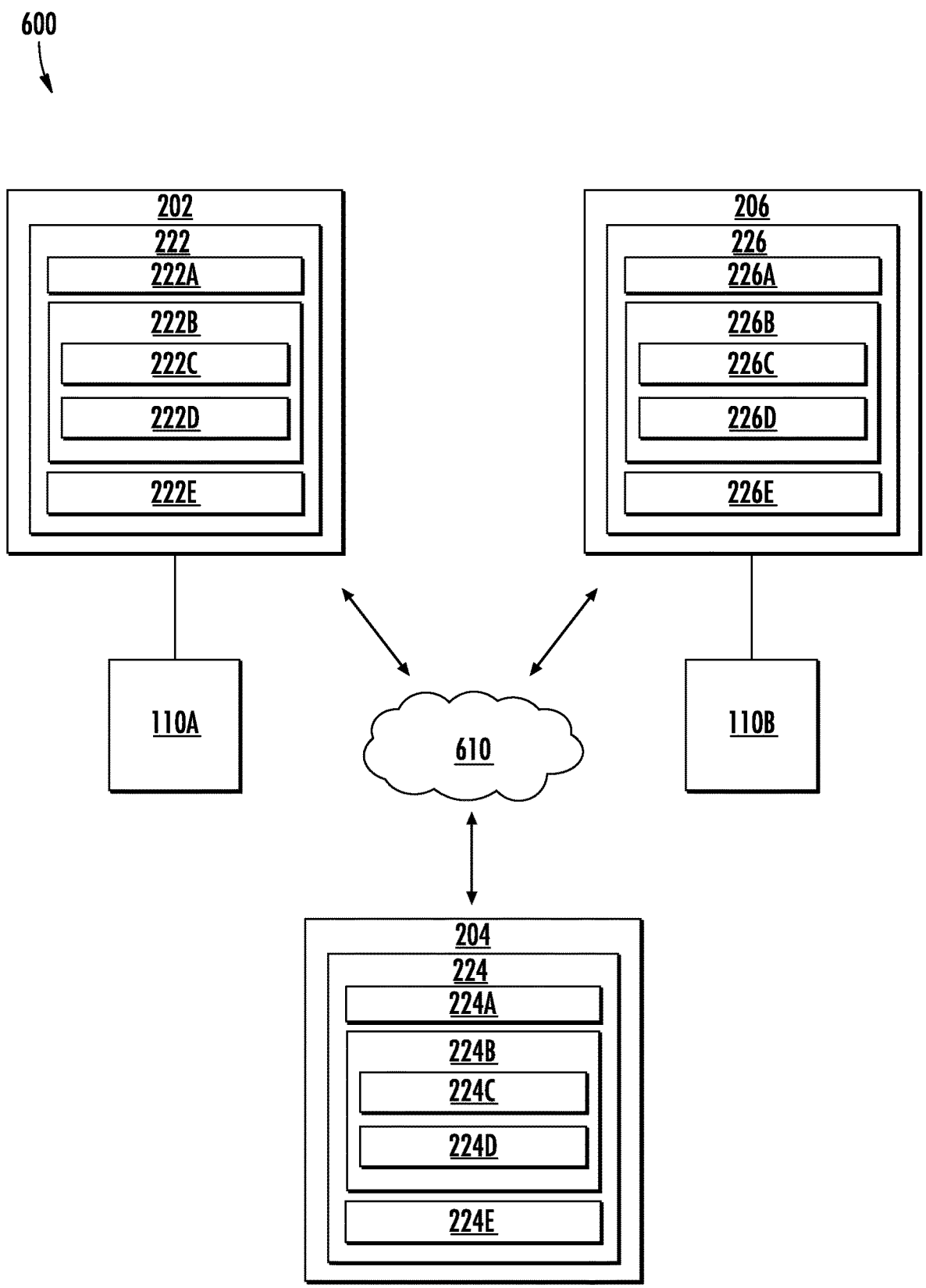
FIG. 7 depicts an example system according to example embodiments of the present disclosure.

FIG. 7 depicts an example system 600 according to example embodiments of the present disclosure. The system 600 can include the first computing system 202, the second computing system 204, and the third computing system 206, which can each be configured to communicate via one or more communications network(s) 610 (e.g., any suitable networks including wired and/or wireless communication links for transmission of the communications and/or data described herein). The system 600 can be implemented on any suitable vehicle, such as the aircraft 100.

The first computing system 202 can be associated with and/or include the first display device 110A. With respect to the aircraft 100, the first computing system 202 can be associated with the flight management system 114 and/or the autopilot system 116. The first computing system 202 can include one or more computing device(s) 222. The computing device(s) 222 can include one or more processor(s) 222A and one or more memory device(s) 222B. The one or more processor(s) 222A can include any suitable processing device, such as a microprocessor, microcontroller, integrated circuit, logic device, and/or other suitable processing device. The one or more memory device(s) 222B can include one or more computer-readable media, including, but not limited to, non-transitory computer-readable media, RAM, ROM, hard drives, flash drives, and/or other memory devices.

The one or more memory device(s) 222B can store information accessible by the one or more processor(s) 222A, including computer-readable instructions 222C that can be executed by the one or more processor(s) 222A. The instructions 222C can be any set of instructions that when executed by the one or more processor(s) 222A, cause the one or more processor(s) 222A to perform operations. In some embodiments, the instructions 222C can be executed by the one or more processor(s) 222A to cause the one or more processor(s) 222A to perform operations, such as any of the operations and functions for which the first computing system 202 and/or the computing device(s) 222 are configured, the operations for providing natural language annunciations (e.g., one or more step(s) of methods 600), as described herein, and/or any other operations or functions of the first computing system 202 and/or the computing device(s) 222. The instructions 222C can be software written in any suitable programming language or can be implemented in hardware. Additionally, and/or alternatively, the instructions 222C can be executed in logically and/or virtually separate threads on processor(s) 222A.

The memory device(s) 222B can further store data 222D that can be accessed by the processors 222A. For example, the data 222D can include one or more sets of data, parameters, outputs, etc. shown and/or discussed with reference to FIGS. 2-6, data associated with the input device(s) 112, data associated with the aircraft 100, data associated with any other component of the system 600, data associated with one or more travel mode(s), data associated with user inputs, data associated with the information 234 displayed on the first display device 110A, and/or any other data and/or information described herein.

The computing device(s) 222 can also include a network interface 222E used to communicate, for example, with the other components of system 600 (e.g., via network(s) 610). The network interface 222E can include any suitable components for interfacing with one or more network(s), including for example, transmitters, receivers, ports, controllers, antennas, and/or other suitable components.

The second computing system 204 can include one or more computing device(s) 224. The computing device(s) 224 can include one or more processor(s) 224A and one or more memory device(s) 224B. The one or more processor(s) 224A can include any suitable processing device, such as a microprocessor, microcontroller, integrated circuit, logic device, and/or other suitable processing device. The one or more memory device(s) 224B can include one or more computer-readable media, including, but not limited to, non-transitory computer-readable media, RAM, ROM, hard drives, flash drives, and/or other memory devices.

The one or more memory device(s) 224B can store information accessible by the one or more processor(s) 224A, including computer-readable instructions 224C that can be executed by the one or more processor(s) 224A. The instructions 224C can be any set of instructions that when executed by the one or more processor(s) 224A, cause the one or more processor(s) 224A to perform operations. In some embodiments, the instructions 224C can be executed by the one or more processor(s) 224A to cause the one or more processor(s) 224A to perform operations, such as any of the operations and functions for which the computing system 204 and/or the computing device(s) 224 are configured, the operations for providing natural language annunciations (e.g., one or more step(s) of method 600), as described herein, and/or any other operations or functions of the second computing system 204 and/or the computing device(s) 224. The instructions 224C can be software written in any suitable programming language or can be implemented in hardware. Additionally, and/or alternatively, the instructions 224C can be executed in logically and/or virtually separate threads on processor(s) 224A.

The memory device(s) 224B can further store data 224D that can be accessed by the processors 224A. For example, the data 222D can include one or more sets of data, parameters (e.g., control modes, keywords), outputs, etc. shown and/or discussed with reference to FIGS. 2-6, data associated with user inputs, data associated with the vehicle 10 (e.g., the aircraft 100), data associated with any other component of the system 600, data associated with one or more travel mode(s), data associated with the information 238 displayed on the first display device 110A, data associated with natural language annunciations, algorithms for converting data into natural language syntax, and/or any other data and/or information described herein.

The computing device(s) 224 can also include a network interface 224E used to communicate, for example, with the other components of system 600 (e.g., via network(s) 610). The network interface 224E can include any suitable components for interfacing with one or more network(s), including for example, transmitters, receivers, ports, controllers, antennas, and/or other suitable components.

The third computing system can be associated with and/or include the second display device 110B. With respect to the aircraft 100, the third computing system 206 can be associated with, for example, the flight mode annunciator 120. The third computing system 206 can include one or more computing device(s) 226. The computing device(s) 226 can include one or more processor(s) 226A and one or more memory device(s) 226B. The one or more processor(s) 226A can include any suitable processing device, such as a microprocessor, microcontroller, integrated circuit, logic device, and/or other suitable processing device. The one or more memory device(s) 226B can include one or more computer-readable media, including, but not limited to, non-transitory computer-readable media, RAM, ROM, hard drives, flash drives, and/or other memory devices.

The one or more memory device(s) 226B can store information accessible by the one or more processor(s) 226A, including computer-readable instructions 226C that can be executed by the one or more processor(s) 226A. The instructions 226C can be any set of instructions that when executed by the one or more processor(s) 226A, cause the one or more processor(s) 226A to perform operations. In some embodiments, the instructions 226C can be executed by the one or more processor(s) 226A to cause the one or more processor(s) 226A to perform operations, such as any of the operations and functions for which the third computing system 206 and/or the computing device(s) 226 are configured, the operations for providing natural language annunciations for an aircraft (e.g., one or more step(s) of methods 600), as described herein, and/or any other operations or functions of the third computing system 206 and/or the computing device(s) 226. The instructions 226C can be software written in any suitable programming language or can be implemented in hardware. Additionally, and/or alternatively, the instructions 226C can be executed in logically and/or virtually separate threads on processor(s) 226A.

The memory device(s) 226B can further store data 226D that can be accessed by the processors 226A. For example, the data 226D can include one or more sets of data, parameters, outputs, etc. shown and/or discussed with reference to FIGS. 2-6, data associated with the vehicle 10 (e.g., the aircraft 100), data associated with any other component of the system 600, data associated with one or more travel mode(s), data associated with the output indicative of the natural language annunciation, data associated with the information 234 displayed on the first display device 110A, and/or any other data and/or information described herein.

The computing device(s) 226 can also include a network interface 226E used to communicate, for example, with the other components of system 600 (e.g., via network(s) 610). The network interface 226E can include any suitable components for interfacing with one or more network(s), including for example, transmitters, receivers, ports, controllers, antennas, and/or other suitable components.

The technology discussed herein makes reference to computer-based systems and actions taken by and information sent to and from computer-based systems. One of ordinary skill in the art will recognize that the inherent flexibility of computer-based systems allows for a great variety of possible configurations, combinations, and divisions of tasks and functionality between and among components. For instance, processes discussed herein can be implemented using a single computing device or multiple computing devices working in combination. Databases, memory, instructions, and applications can be implemented on a single system or distributed across multiple systems. Distributed components can operate sequentially or in parallel.

Although specific features of various embodiments may be shown in some drawings and not in others, this is for convenience only. In accordance with the principles of the present disclosure, any feature of a drawing may be referenced and/or claimed in combination with any feature of any other drawing.

This written description uses examples to disclose the present disclosure, including the best mode, and also to enable any person skilled in the art to practice the present disclosure, including making and using any devices or systems and performing any incorporated methods. The patentable scope of the present disclosure is defined by the claims, and can include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. A method for providing natural language annunciations to a user operating an aircraft, comprising:
    receiving, by one or more computing devices, a user input associated with one or more travel modes of the aircraft;
    displaying, on a first display device positioned within a cockpit of the aircraft, information indicative of the one or more travel modes;
    generating, by the one or more computing devices, an output indicative of a natural language annunciation based at least in part on a set of data indicative of the user input, wherein generating the output indicative of the natural language annunciation comprises matching one or more terms or phrases associated with the one or more travel modes included in the set of data with one or more keywords stored on the one or more computing devices;
    sending, by the one or more computing devices, the output indicative of the natural language annunciation to one or more other computing devices associated with a second display device positioned within the cockpit of the aircraft; and
    displaying, on the second display device, the output indicative of the natural language annunciation to the user positioned within the cockpit of the aircraft, wherein the natural language annunciation is displayed on the second display device as one or more text blocks that include descriptions in natural language syntax that are consistent with the one or more travel modes displayed on the first display device, wherein the descriptions include the one or more keywords, wherein the one or more computing devices comprise:
        a first computing device comprising the first display device;
        a second computing device configured to receive the set of data indicative of the user input from the first computing device; and
        a third computing device comprising the second display device and configured to receive the output indicative of the natural language from the second computing device.

2. The method of claim 1, wherein generating, by the one or more computing devices, the output indicative of the natural language annunciation further comprises:
    generating, by the one or more computing devices, the output indicative of the natural language annunciation based at least in part on one or more parameters associated with the one or more travel modes.

3. The method of claim 1, wherein the one or more travel modes comprise at least one of a current travel mode and a future travel mode.

4. The method of claim 1, wherein the set of data is received from a computing system associated with at least one of a flight management system of the aircraft and an autopilot system of the aircraft.

5. The method of claim 1, wherein the first display device is associated with a flight management system of the aircraft.

6. The method of claim 1, wherein the first display device is associated with an autopilot system of the aircraft.

7. The method of claim 1, wherein the second display device is associated with a flight mode annunciator of the aircraft.

8. The method of claim 1, wherein the user input is a voice input.

9. A computing system for providing natural language annunciations to a user operating an aircraft, the system comprising:
    one or more processors and one or more memory devices included in the aircraft, the one or more memory devices storing instructions that when executed by the one or more processors cause the one or more processors to perform operations, the operations comprising:
        receiving a user input associated with one or more travel modes of the aircraft, wherein information indicative of the one or more travel modes of the aircraft is provided for display on a first display device positioned within a cockpit of the aircraft;
        generating an output indicative of a natural language annunciation based at least in part on a set of data indicative of the user input, wherein generating the output indicative of the natural language annunciation comprises matching one or more terms or phrases associated with the one or more travel modes included in the set of data with one or more keywords stored on the one or more memory devices; and sending the output indicative of the natural language annunciation to one or more computing devices associated with a second display device positioned within the cockpit, wherein the output indicative of the natural language annunciation is provided for display on the second display device such that the output indicative of the natural language annunciation is displayed on the second display device as one or more text blocks that include descriptions in natural language syntax that are consistent with the one or more travel modes provided for display on the first display device, wherein the descriptions include the one or more keywords, and wherein the one or more computing devices comprise:

a first computing device comprising the first display device;

a second computing device configured to receive the set of data indicative of the user input from the first computing device; and a third computing device comprising the second display device and configured to receive the output indicative of the natural language from the second computing device.

10. The system of claim 9, wherein generating the output indicative of the natural language annunciation further comprises:

generating the output indicative of the natural language annunciation based at least in part on one or more parameters associated with the one or more travel modes of the aircraft.

11. The system of claim 9, wherein the one or more travel modes comprise at least one of a current travel mode associated with the aircraft and a future travel mode associated with the aircraft.

12. The system of claim 9, wherein the first display device is associated with at least one of a flight management system and an autopilot system.

13. The system of claim 9, wherein the second display device is associated with a flight mode annunciator.

14. The system of claim 9, wherein the user input is a voice input.

15. An aircraft, comprising:

a cockpit;

a first computing system comprising a first display device located within the cockpit, the first computing system is configured to:

receive, from a user positioned within the cockpit and operating the aircraft, a user input associated with one or more flight modes of the aircraft, display, on the first display device, information indicative of the one or more flight modes of the aircraft, and send a set of data indicative of the user input associated with the one or more flight modes of the aircraft;

a second computing system configured to:

receive the set of data indicative of the user input associated with the one or more flight modes of the aircraft, generate an output indicative of a natural language annunciation based at least in part on the set of data, wherein the second computing system generates the output indicative of the natural language annunciation by matching one or more terms or phrases associated with the one or more flight modes included in the set of data with one or more keywords associated with the one or more flight modes and being stored on the second computing system, and send the output indicative of the natural language annunciation; and a third computing system comprising a second display device located within the cockpit, the third computing system is configured to:

receive the output indicative of the natural language annunciation, and display, on the second display device, the output indicative of the natural language annunciation to the user positioned within the cockpit of the aircraft, wherein the natural language annunciation is displayed on the second display device as one or more text blocks that include descriptions in natural language syntax that are consistent with the one or more flight modes displayed on the first display device, wherein the descriptions include the one or more keywords.

16. The aircraft of claim 15, wherein the first computing system is associated with at least one of a flight management system of the aircraft and an autopilot system of the aircraft, and wherein the third computing system is associated with a flight mode annunciator.

17. The aircraft of claim 15, wherein the one or more keywords associated with the one or more flight modes of the aircraft include at least one of the following: flight goals, flight plans, flight constraints, flight stipulations, and flight value statements.

18. The aircraft of claim 15, wherein the first computing system is configured to receive a second user input confirming the information displayed on the first display device.

* * * * *